April 6, 1965
D. W. KINNEY
3,176,869
NAIL-FASTENED INSULATED OUTLET BOX
Filed March 21, 1963
2 Sheets-Sheet 1
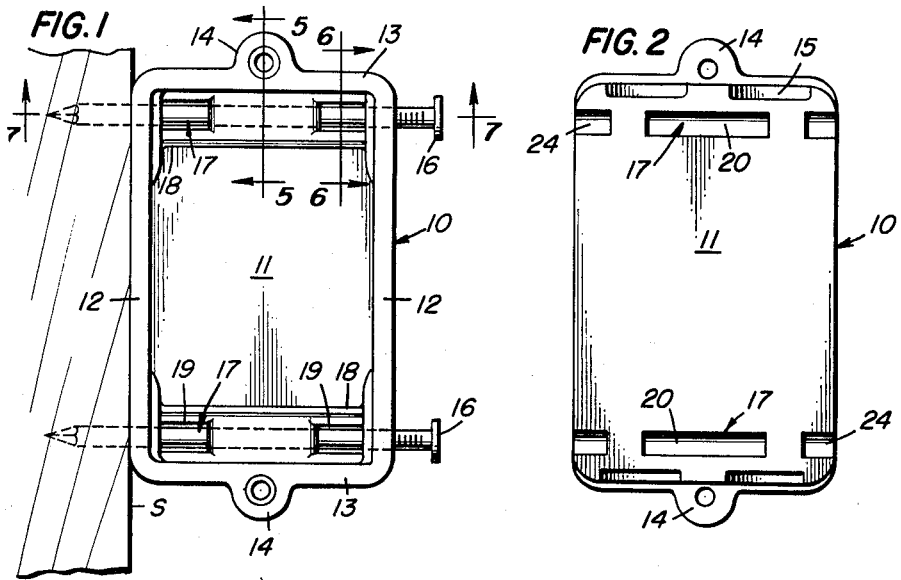
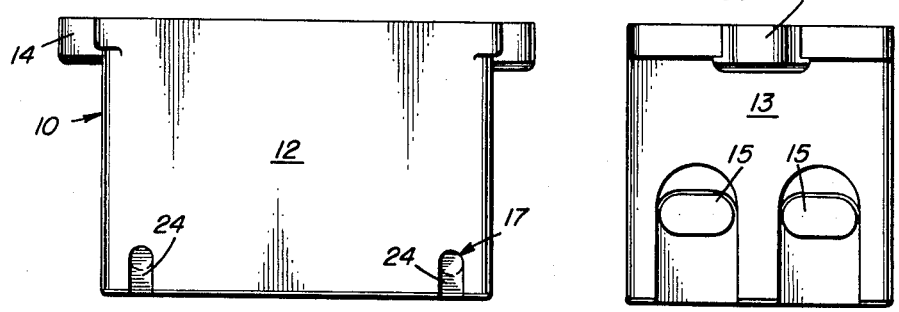
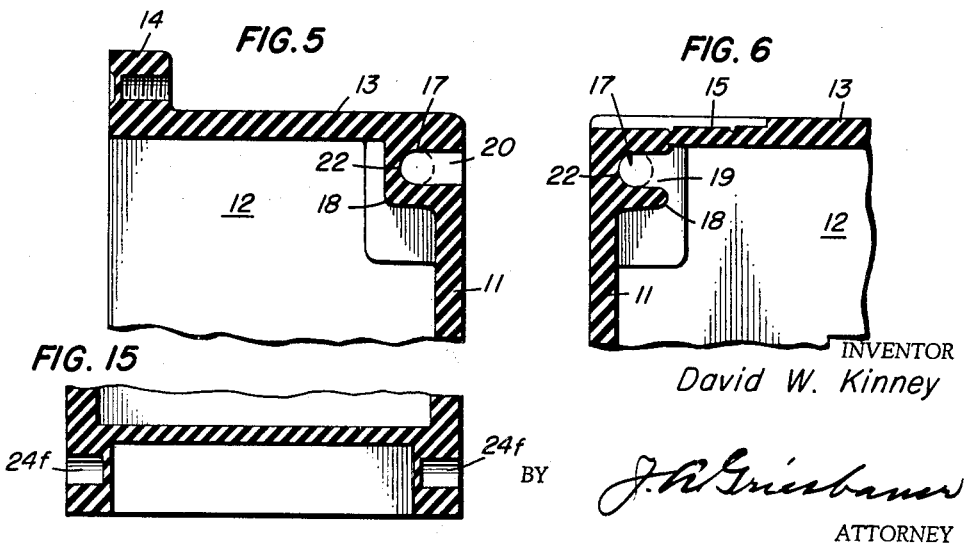
INVENTOR
David W. Kinney
BY
ATTORNEY April 6, 1965   D. W. KINNEY   3,176,869
NAIL-FASTENED INSULATED OUTLET BOX
Filed March 21, 1963   2 Sheets-Sheet 2
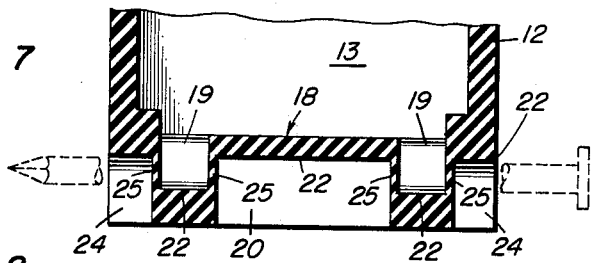
FIG. 7
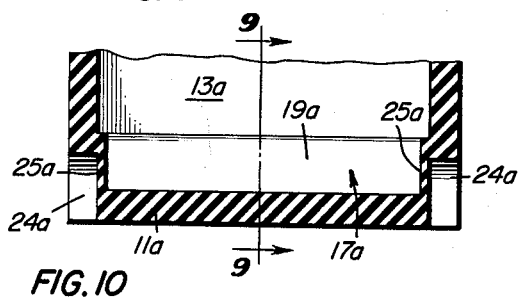
FIG. 8
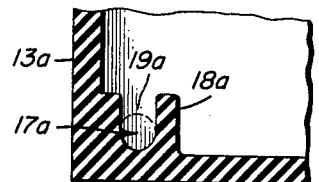
FIG. 9
FIG. 10
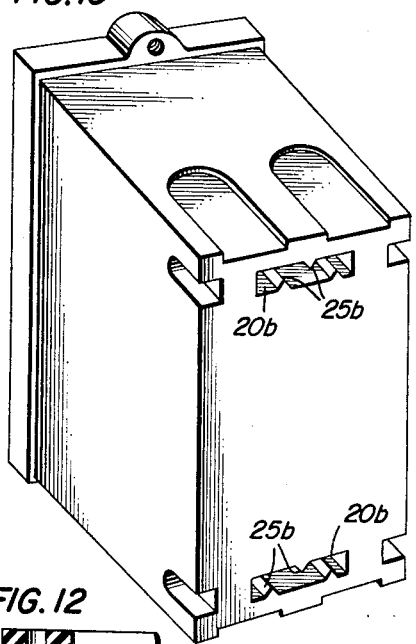
FIG. 12
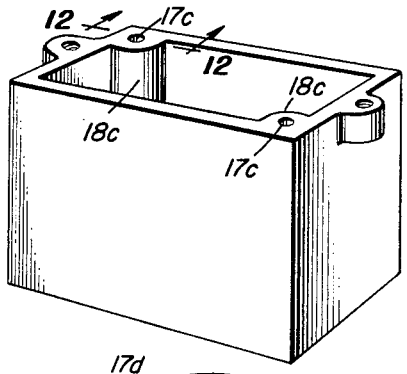
FIG. 11
FIG. 13
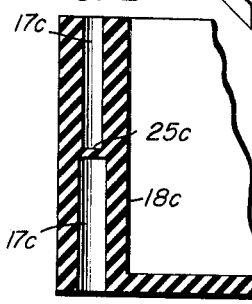
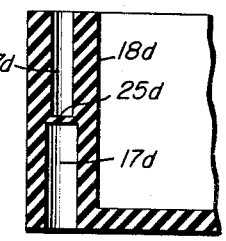
FIG. 14
INVENTOR
David W. Kinney
BY  *J. W. Griesbauer*
ATTORNEY

United States Patent Office 3,176,869
Patented Apr. 6, 1965

3,176,869
NAIL-FASTENED INSULATED OUTLET BOX
David W. Kinney, Parkersburg, W. Va., assignor to Union Insulating Co., Inc., Parkersburg, W. Va., a corporation of West Virginia
Filed Mar. 21, 1963, Ser. No. 266,866
6 Claims. (Cl. 220—3.9)

This invention relates generally to electric wiring devices such as outlet and junction boxes used in the wiring circuits of dwellings and other buildings; and it relates more particularly to such boxes molded of suitable insulating material, the improved box being adapted to be fastened to a support by ordinary nails.

In the past such non-metallic outlet boxes have been extensively used in the mounting of switches, outlet receptacles and other electrical devices, and where the insulated boxes have been used on wall studding, it has been necessary to use metal fastening brackets on the boxes. Such metal brackets have either had portions molded in the material of the box or portions fixed to the insulating material by rivets or eyelets, and the projecting portions of the brackets have had holes for fastening screws or nails, or had integral spurs to be driven into a stud or other wood support, or both holes and spurs. The fixing of metallic brackets to insulated boxes involves additional assembly operations and adds considerably to the cost of producing the box. With the extensively used generally rectangular box that is side-mounted on a stud or the like, the projecting portions of the bracket make the insulated box more difficult to pack for shipment without damage and because of the sharp corners of metal brackets and the spurs thereon, such bracketed boxes are less safe to handle at the job site.

Applicant knows of no prior side mounted molded insulated box designed to be fastened to a stud or other support by ordinary nails such as from 10d to 16d, although for many years it has been common practice to fasten such outlet boxes made of metal by such nails. In those old metal boxes nails have been driven through alined openings in opposed side walls of the box; and it has also been proposed to make the boxes of cast iron with integrally molded ears or brackets apertured to receive fastening screws or nails. With respect to insulated boxes, it has been common to fasten them by screws in holes formed in the bottoms of the boxes, as disclosed in the surface wiring box of Patent No. 2,959,633, and in earlier patents.

One object of the invention is to provide a practical box molded of insulating material with one or more nail-receiving passageways molded in the material of the box and extending from one face to an opposite face of the box, the formed passageways being such that they support and guide the nail in a manner that prevents it from bending as it is hammered into a stud or other support.

Another object is to so construct the nail passageway in such a box, that the nail will be temporarily held in the passageway against endwise movement until it is hammered into a support, whether the box is sold with the nail or nails captive in the box or the nail is inserted into the passageway by the electrician who installs the box.

Another object is to form the nail passageway in such a box in a manner that will permit the box to be molded in finished form by a simple molding apparatus in which the two die parts of the mold have a relative movement in a straight line and no laterally movable molding parts are necessary.

Another object is to provide such a box with a nail passageway that includes at least one molded groove that opens into the interior of the box and has a depth greater than the diameter of the nail, so that any portion of the nail exposed to the interior of the box will be in substantial electrical isolation with respect to any electrical conductors used in the box.

Another object is to provide in such a box a nail passageway that includes a plurality of longitudinally alined grooves some of which open into the interior of the box and the others open to the exterior of the box, thereby providing the passageway with a plurality of solid wall portions which support and guide the nail and prevent it from being bent when it is hammered into a support.

Another object is to provide an insulated box with a passageway such as indicated in the preceding paragraph, in which there is molded across the passageway at the end or ends of one or more of the grooves, thin breakable layers or films of the molded material, the films or flashes being adapted to be pierced by the nail when it is inserted in the passageway, so that the nails will be frictionally held captive during shipment and handling of the box, and/or will be temporarily held while the nails are being hammered.

With the above and other objects and advantages in view, the invention resides in the novel combinations and arrangements of parts and the novel features of construction hereinafter described and claimed, and illustrated in the accompanying drawings which show the present preferred embodiments of the invention.

In the drawings:

FIG. 1 is a front or top view of a box of rectangular shape showing one of its sides against a stud and two fastening nails partly driven into the stud, the latter being in section and partly broken away;

FIG. 2 is a rear or bottom view of the box;

FIG. 3 is a side elevation;

FIG. 4 is an end view;

FIG. 5 is a detail section on an enlarged scale taken on line 5—5 in FIG. 1 looking in the direction of the arrow, the nail being omitted;

FIG. 6 is an enlarged detail section taken on line 6—6 in FIG. 1 looking in the direction of the arrow;

FIG. 7 is a transverse section through the lower part of the box on an enlarged scale taken on the line 7—7 in FIG. 1 looking in the direction of the arrow, with the stud omitted and a part of the nail in broken lines, to show the unbroken nail-holding films or flashes across the nail passageway;

FIG. 8 is a detail section similar to FIG. 7 showing a modified form of the invention in which the nail passageway is formed by a single groove;

FIG. 9 is a detail section taken on the line 9—9 in FIG. 8;

FIG. 10 is a perspective view of a modified form of box looking toward its bottom to show molded ribs in the nail passageways to hold the nails;

FIG. 11 is a perspective view of another modification in which the nail passageways are in diagonally opposite corners of a rectangular box and extend from top to bottom of it;

FIG. 12 is a detail section taken on line 12—12 of FIG. 11 looking in the direction of the arrow;

FIG. 13 is a top view of a circular box in which the invention is embodied;

FIG. 14 is a detail section taken on the line 14—14 in FIG. 13 looking in the direction of the arrow; and FIG. 15 is a detail sectional view, similar to FIG. 8, showing a further modification.

In the preferred embodiment of the invention shown in FIGS. 1–7, the box 10 is of rectangular shape but it may be of round, octagonal or other shape. It has a bottom wall 11, a surrounding upright wall with opposed sides 12 and opposed ends 13 and an open top or front face. At the center of the end faces or walls are the usual apertured ears 14 to receive screws for fastening the mounting strap of a switch, outlet receptacle or other electrical device used in the box. These ears are preferably made with molded internal screw threads and breakable plaster-excluding flashes in accordance with Patents Nos. 2,775,-916 and 2,867,349. In the surrounding side wall, preferably the end walls 13, are molded the usual knockouts 15 for electric conductors or cables that enter the box. The cables that enter the knockout openings may be fastened by the usual screw-adjusted clamp plates (not shown) on the inside of the box.

As shown in FIG. 1, the box is side mounted on a stud or similar support S by two ordinary wire-type nails 16 such as 10d to 16d, but any number and arrangement of the nails may be used. The nails extend through nail passageways, generally indicated at 17, which are molded in the material of the box and extend through the box from one of its faces to the opposite face. As shown these passageways are located at the juncture of the bottom wall 11 with an adjoining end wall 13. When such walls are relatively thin, internal thickened portions or enlargements 18 are formed at such junctures or at places where the passageways are located. At the ends of the transversely extending enlargements 18, the side walls may be thickened as shown, and if desired other portions of the body of the box, such as the rim and the corners may be formed with thickened portions to re-enforce the same.

Each of the passageways preferably includes a plurality of longitudinally extending grooves some of which open into the interior of the box and the remainder open to the exterior of the box. While any number of the grooves may be used, I preferably provide two inwardly facing grooves 19 and an intermediate outwardly facing groove 20, as more clearly shown in FIG. 7. That arrangement of the grooves provides the passageway with longitudinally aligned solid wall portions 22 formed by the bottom of the grooves, which wall portions support and guide the nail and tend to prevent it from bending when it is hammered into a stud or other support. The wall portions or bottoms 22 of the grooves 19 and 20 also aline with the bottoms of recesses or grooves 24 formed at the junctures of the side walls 12 with the bottom wall 11 as seen in FIGS. 2 and 3. These grooves or recesses 24 are at the ends of the passageways and also open through the bottom of the box as shown in FIG. 7.

By thus forming the nail passageways, the box may be molded in an automatic molding apparatus which has a simple mold in which the two relatively movable die parts have a straight line movement and no laterally movable molding part is necessary. The grooves 19, 20 and 24 may be formed by properly shaping the lugs in the cavity of the die and the force punch of the die. The box can thus be molded in finished form and at a low cost. It will be noted that the passageways for the nails extend parallel with the plane of the open top of the box and perpendicular to the line of travel of the mold. Also that the opposed flat side walls of the grooves, the ribs thereon and the films at the ends of the grooves all extend in planes parallel to the line of travel of the mold.

For the above stated reasons the ends of the nail passageways are preferably formed by the grooves 24 which open at the bottom of the box but it is obvious that the ends of the passageway may be otherwise formed, as by the use of laterally retractable molding pins of the molding apparatus or by drilling holes in the side walls of the box after it has been molded. Such a modification is shown in FIG. 15 wherein the ends of the nail passageway are formed by cylindrical holes 24f which may be drilled or molded. These holes are alined with the groove or grooves that form the remainder of the passageway.

Preferably but not necessarily some means may be provided for holding nails captive in the boxes when they are sold and shipped or for at least temporarily holding the nails in the passageways during handling and the hammering of the nails into a support. There are several ways in which the nails may be held captive. They can be molded in the box. Another way is to mold bosses, ribs or other protuberances on the walls of the grooves to frictionally hold the nail against endwise movement in the passageway after it has been inserted in the previously molded box. Obviously the boxes may be sold with the nails captive therein or sold without captive nails. My present preferred means for holding the nails is to mold across the passageway 17 one or more thin breakable layers or films 25 of the material, which films will be pierced by the nail when it is inserted in the passageway. One advantage of the use of such breakable films is that nails having different diameters will be effectively gripped by the unbroken portions of the films, and another is that these thin films may be molded at the ends of one or more of the grooves by slightly spacing laterally the lugs or portions of the two die parts that shape the grooves. In the preferred form illustrated, one of these breakable films 25 is formed at each end of the grooves 19. I have found that if these films have a thickness of from .005″ to .020″, the nails such as from 10d to 16d will be satisfactorily held. Whatever size nail is used, the films will help to keep the box sealed.

In the modified form of the invention shown in FIGS. 8 and 9, the nail passageway 17$^a$ is formed by a single groove 19$^a$ which opens only into the interior of the box, and if desired a breakable film 25$^a$ may be formed at each end of the groove, as seen in FIG. 8. The passageway 17$^a$ are formed in transversely extending enlargements 18$^a$ at the juncture of the bottom wall 11$^a$ with the end wall 13$^a$. The ends of the passageway 17$^a$ may be formed by the downwardly and outwardly opening recesses or grooves 24$^a$ which correspond to the recesses 24 or by molding or drilling holes. This form of the invention is less desirable than the preferred form because only one-half of the circumference of the nail will be supported and guided by the groove; and if the nail is driven into very hard wood, its intermediate portion might bend and bow above the top of the groove 19$^a$ with the resulting possibility of an electric conductor within the box coming in contact with the bent portion of the nail.

In FIG. 10 I have shown how the nail may be held against endwise movement after it has been inserted in the passageway, by means of protuberances molded on the wall of the groove 20$^b$ which corresponds to the groove 20 in FIG. 7. The box of FIG. 10 is of the same construction as the box first described with the exceptions that the flashes or films 25 are not used and that one or more inwardly projecting upright ribs or ridges 25$^b$ are molded on the walls of the groove 20$^b$. These ridges 25$^b$ extend in the direction of the opening movement of the mold and are formed by grooves on the mold part that shapes the groove. Any number and arrangement of the inwardly projecting ridges may be used and if desired they may also be formed on the walls of the grooves such as 19 and 24 in FIG. 7. The height or diameter of these rounded ridges or protuberances will depend upon the diameter of the nail that is used.

While in the above embodiments the nail passageway extends crosswise of the box preferably from side to side, it may extend from the bottom face to the top face of the box as shown rather conventionally in FIGS. 11 through 14. FIGS. 11 and 12 show a rectangular box the bottom of which is to be fastened to a support by two nails located in diagonally opposite corners of the box. At those corners are formed within the box at the juncture of the side and end walls, upright enlargements 18$^c$ which extend from the top to the bottom of the box. A nail passageway 17$^c$ is molded in each of these enlargements by two axially alined molding pins carried by the two sections of the mold, the pins being of such length that when the mold is closed the opposed ends of the pins do not contact thereby forming a transverse breakable nail-holding film 25$^c$ between the ends of the passageway as shown in FIG. 12.

FIGS. 13 and 14 show conventionally a round box with a circular bottom to be engaged with a support and an upstanding surrounding side wall on which are formed at diametrically opposite points the usual inwardly projecting apertured ears 14d to which are fastened by screws an insulated cover if the box is a junction box or the apertured ends of a mounting strap of a switch or other electrical device used in an outlet box. At other diametrically opposite points on the side wall are upright and preferably inwardly projecting posts or enlargement 18d. In the latter are molded nail passageways 17d in the manner above stated with respect to the passageways 17c, in order to form a transverse breakable nail-holding film or flash 25d shown in FIG. 14. Thus the bottom of the box may be fastened to the support by two nails in the passageways. As a practical matter in molding holes such as 17c and 17d by two axially alined pins, it is desirable to make one of the pins of slightly larger diameter than the other, so that there will be some possible overlap of the opposed end areas of the pins to compensate for possible bending of one or both of the pins during the molding operation. As the material is under high pressure, it is not uncommon for these pins to be deflected, and by making the lower pin of a slightly larger diameter, a certain amount of bending can be tolerated. Hence the lower portions of the holes or passageways 17c and 17d are shown of slightly larger diameter. While this results in the hole being "nail size" only on one face of the box, the nail will be adequately guided and will be temporarily held against unintentional endwise movement by the pierced film of material.

In the foregoing described or any other embodiment of the invention in which the nail passageway is formed by one or more grooves which open into the interior of the box, it will be necessary, in order to satisfy the standard requirements of Underwriter's Laboratories, Inc., to have any inwardly exposed portions of the fastening nails so located that electrical conductors within the box will be prevented from contacting the nails. It is therefore necessary or at least desirable, that the depth of the grooves be substantially greater than the diameter of the largest nail that will be used to fasten the box. There should be at least 1/32" distance between the plane of the top of the recess and the exposed surface of the nail, in order to have the nail substantially isolated from the conductors in the box.

For many years insulated outlet and junction boxes have been molded of phenolic resin compounds such as "Bakelite," but other types of basic resins have been used such as urea, vinyl, filled polyester materials, and certain epoxy resin products. It has been common practice for years to add to such molding compounds fibrous materials to increase their impact resistance. I have successfully tested and used nail-up boxes made in accordance with this invention, from a phenolic resin and filler compound having an impact resistance measured on an Izod tester of approximately .42 foot pounds per inch, but it is to be understood that other insulating molding compounds having a greater or lesser impact resistance may be used satisfactorily.

It will be noted that in all of the disclosed embodiments of the invention, the nail passageway, whether within or without the interior of the box, passes from one face, whether the top, side or end, to the opposite face, and that the passageway has between its ends, solid wall portions that guide and support the nail and prevent it from bending when it is hammered. It will also be noted that the nail, will be substantially isolated electrically from any wiring in the box even though a part of the nail may be exposed at the interior of the box, and that the box may be made in finished form in an automatically operating molding apparatus since the most simple type of mold may be used. The use of the breakable films across the nail passageway or the use of the molded ridges or other protuberances on the walls of the passageway, permits the box to be sold without nails or with the nails held captive therein.

From the foregoing, taken in connection with the accompanying drawing, it will be seen that novel and advantageous provisions have been made for carrying out the objects of the invention, and while preferences have been disclosed, attention is invited to the possibility of making variations within the scope of the invention as claimed.

I claim:

1. A molded plastic wiring box that may be fastened to a support by one or more nails and that is made directly in finished form by a simple molding apparatus in which the two die parts have a relative movement in a straight line and no laterally movable die parts are required, said box comprising in combination
   (A) a body molded of insulating material and having an open top, a bottom wall and opposed end and side walls, one said side wall being adapted to engage a support, and
   (B) nail-receiving passageways molded in the material of the body at the juncture of said bottom and end walls, said passageways extending parallel to the plane of the open face of the body and from one side wall to the other,
   (C) said passageways being formed by a plurality of longitudinally extending grooves at least one of which opens into the interior of the body toward its open top and the others open to the exterior through said bottom wall, said grooves having longitudinally alined bottom wall portions engageable by the nails to support and guide them as they are hammered into a support to prevent bending of the nails, said grooves being of greater depth than the diameter of the nails whereby the portions of the nails exposed at the interior of the box will be in substantial isolation from a conductor within the box.

2. The box of claim 1 with means for holding the nails captive when inserted in said passageways, said means comprising breakable films molded on the material of the body and extending across said passageways at the ends of those grooves that open into the interior of the body, said films being in planes perpendicular to the plane of the open top of the body.

3. The box of claim 1 in which said grooves have opposed side walls perpendicular to the plane of the open top of the body, together with parallel ribs molded on at least some of said walls of the grooves and extending in planes perpendicular to the plane of the open top of the body, said ribs projecting into said passageways and being adapted to be frictionally engaged by the nails to hold them captive until hammered into a support.

4. A molded plastic wiring box that may be fastened to a support by one or more nails and that is made directly in finished form by a simple molding apparatus in which the two die parts have a relative movement in a straight line and no laterally movable die parts are required, said box comprising in combination
   (A) a body molded of insulating material and having an open top, a bottom wall and opposed end and side walls, one said side wall being adapted to engage a support,
   (B) interior enlargements molded at the juncture of the bottom and end walls and extending from one side wall to the other,
   (C) nail receiving passageways molded in said enlargements and the adjoining portions of the side and bottom walls, each of said passageways comprising a plurality of longitudinally extending grooves some of which open into the interior of the body toward the open top of the box and the others open to the exterior through the bottom wall,
   (D) the bottoms of said grooves providing the passageways with solid inner wall portions engageable by the nails to support and guide the latter as they are hammered into a support, thereby preventing bending of the nails, and (E) nail gripping means molded in the material of the box body and projecting into said passageways transversely thereof for engagement by the inserted nails to frictionally hold them captive until hammered into a support, said nail gripping means also extending in planes perpendicular to the plane of the open top of the body.

5. The box of claim 4 in which said nail gripping means comprises breakable films of the material of the box body molded across said passageways at the ends of those grooves that open into the interior of the body, said film extending in planes perpendicular to the plane of the open top of the body and being adapted to be pierced by the inserted nails, the unbroken portions of said films frictionally holding the inserted nails captive.

6. The box of claim 4 in which said grooves have opposed flat side wall portions disposed in planes perpendicular to the plane of the open top of the body, and said nail gripping means comprises spaced parallel ribs molded on said wall portions of at least some of the grooves, said ribs extending in planes perpendicular to the plane of the open top of the body.

References Cited by the Examiner
UNITED STATES PATENTS

| | | | |
|---|---|---|---|
| 1,328,993 | 1/20 | Hayden | 220—3.92 |
| 1,857,787 | 5/32 | Meeks et al. | 220—3.92 |
| 2,149,719 | 3/39 | Arnest | 220—3.4 |
| 2,639,054 | 5/53 | Austin | 220—3.92 |
| 2,730,261 | 1/56 | Tutt | 220—3.7 |
| 2,738,894 | 3/56 | Cook et al. | 220—3.9 |
| 2,867,349 | 1/59 | Parker | 220—3.9 |
| 2,959,633 | 11/60 | Palmer et al. | 220—3.2 X |

FOREIGN PATENTS 175,991   9/53   Austria.

THERON E. CONDON, *Primary Examiner.*